United States Patent [19]

Abbott

[11] 4,358,827

[45] Nov. 9, 1982

[54] CONTROLLING THE TREATMENT OF MIXTURES COMPRISING SOLID AND LIQUID

[75] Inventor: John Abbott, Burton-on-Trent, England

[73] Assignee: Coal Industry (Patents) Limited, London, England

[21] Appl. No.: 173,921

[22] Filed: Jul. 31, 1980

[30] Foreign Application Priority Data

Sep. 25, 1979 [GB] United Kingdom ............... 7933128

[51] Int. Cl.³ .......................... G06F 15/46; B03B 5/24
[52] U.S. Cl. .................................... 364/500; 364/552
[58] Field of Search ............... 364/500, 502, 551, 552

[56] References Cited

U.S. PATENT DOCUMENTS

| | | | |
|---|---|---|---|
| 3,551,897 | 12/1970 | Cooper | 364/502 X |
| 3,929,017 | 12/1975 | Kowalski | 364/418 X |
| 3,974,940 | 8/1976 | Bartik | 364/418 X |
| 4,045,657 | 8/1977 | Falke | 364/502 X |
| 4,106,099 | 8/1978 | Elliott et al. | 364/510 |
| 4,118,778 | 10/1978 | Strub | 364/502 |
| 4,187,542 | 2/1980 | Ball et al. | 364/502 |
| 4,263,010 | 4/1981 | Randolph | 364/502 X |
| 4,272,367 | 6/1981 | Wieffen | 364/502 X |
| 4,278,536 | 7/1981 | Weiffen | 364/502 X |

OTHER PUBLICATIONS

Automated Sewage Treatment Plant on the River Emscher; Kormayer, H, Siemens Power Engineering, 1979, No. 8, pp. 245–249.

*Primary Examiner*—Edward J. Wise
*Attorney, Agent, or Firm*—James C. Wray

[57] ABSTRACT

Treatment equipment for mixtures comprising solid and liquid is controlled by determining a value comprising the cumulative mass throughput of solid and an inverse term comprising total treatment time, and monitoring said value substantially continuously until it substantially reaches a maximum.

15 Claims, 3 Drawing Figures

CONTROLLING THE TREATMENT OF MIXTURES COMPRISING SOLID AND LIQUID

This invention relates to methods of and apparatus for controlling the treatment of mixtures comprising solid and liquid.

In particular, although not exclusively, the present invention relates to the control of treatment equipment for dewatering slurry or sludge mixtures.

In the treatment of slurry in a variable volume filter press it is possible to vary the cake thickness in order to try and achieve a maximum throughput of material. The thinner the cake the more rapid is the drainage of filtrate from the cake, however, more treatment cycles are required to achieve a given output.

In order to try and achieve an optimum cake thickness it is usual practice for a considerable number of experimental treatment cycles to be conducted and even with such precaution when the filtration characteristics of the feed slurry mixture vary the experimental results may be found unreliable.

An object of the present invention is to provide an improved method of and apparatus for controlling the treatment of mixtures in a variable volume filter press so that a substantially maximum or improved throughput can be achieved.

According to one aspect of the present invention, a method of controlling the treatment of a mixture comprising solid and liquid, comprises the steps of determining the mass flow rate of feed of untreated solid and thereby the cumulative mass throughput of solids during running time, running time being the period of time in a treatment cycle during which the mixture feed is urged for treatment, determining a value comprising the cumulative mass throughput of solids and an inverse term comprising total treatment time, the total treatment time being the sum of running time and dead time, dead time being the period of time in a treatment cycle during which the mixture feed is not urged for treatment, and monitoring said value substantially continuously until it substantially reaches a maximum.

Preferably, a signal is derived which is indicative that said determined value substantially has reached the maximum value and which is used in the control of the treatment cycle.

Preferably, the dead time for each current treatment cycle is compared with a previously determined dead time.

Advantageously, said previous determined dead time is determined from a plurality of previously completed treatment cycles.

Preferably, if the dead time for a current treatment cycle differs from said previously determined dead time, the determined dead time is up-dated to take account of the current dead time.

Preferably, the determined dead time is up-dated to take account of the current dead time only if the difference is within a preselected amount.

Advantageously, if the dead time of a current treatment cycle differs from the said previously determined dead time by a further preselected amount an alarm signal is derived.

According to another aspect of the present invention, apparatus for carrying out the above defined method of controlling the treatment of a mixture comprising solid and liquid, comprises means for determining the mass flow rate of feed of untreated solid and thereby determining the cumulative throughput of solid against running time, running time being the period of time in a treatment cycle during which the mixture feed is urged for treatment, said means including timer means for enabling a value comprising the cumulative throughput of solid and an inverse term comprising total treatment time to be determined, the total treatment time being the sum of running time and dead time, dead time being the period of time in a treatment cycle during which the mixture feed is not urged for treatment, and surveillance means for monitoring said determined value substantially continuously until it substantially reaches a maximum.

Preferably, means are provided for deriving a signal which is indicative that said determined value substantially has reached the maximum and which is used in the control of the treatment cycle.

Preferably, the surveillance means compares the dead time for each current treatment cycle with a previously determined dead time.

Preferably, said previously determined dead time is determined from a plurality of previously completed treatment cycles.

Preferably, means are provided such that if the dead time for each current treatment cycle differs from the said previously determined dead time, the said previously determined dead time is adjusted to take account of the current dead time.

Preferably, the previously determined dead time is adjusted to take account of the current dead time only if the difference is within a preselected amount.

Preferably, means are provided such that if the dead time for a current treatment cycle differs from the said previously determined dead time by a further preselected amount an alarm signal is derived.

Preferably, the means for determining the rate of feed of untreated solid comprises flow meter means for determining the volume flow rate of mixture feed and a density meter means to determine the solid content of the mixture feed.

By way of example only, one embodiment of the present invention will be described with reference to the accompanying drawings, in which.

Figure 1:
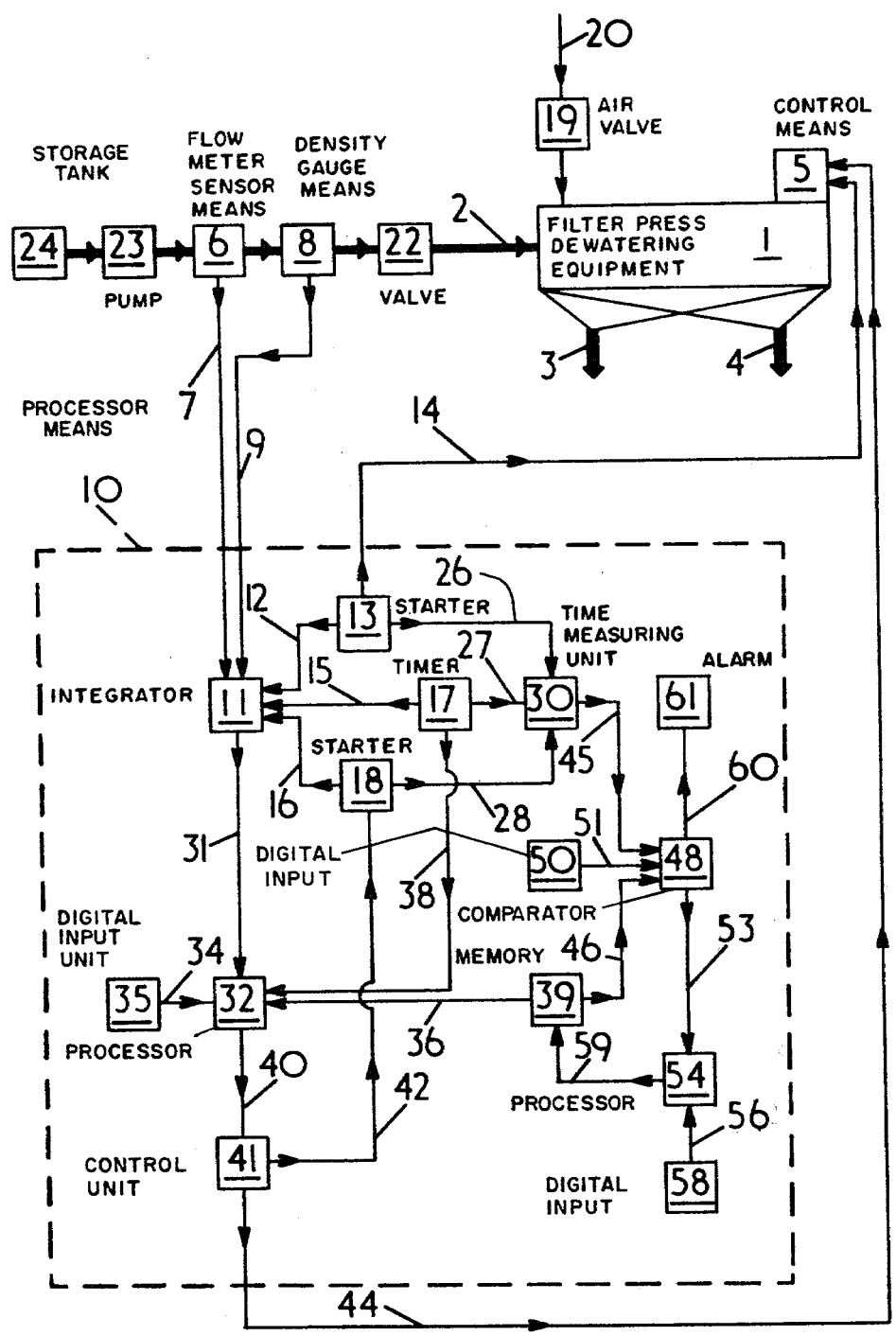
FIG. 1 is a block diagram of apparatus for controlling the treatment of coal slurry in filter press treatment equipment.

FIG. 1 of the drawings indicates filter press dewatering treatment equipment 1 comprising a plurality of chambers arranged in series to receive a coal slurry mixture feed pumped along line 2 into the filter press equipment. The coal slurry mixture comprises solid, i.e., fine coal and shale, and liquid, i.e., water. During treatment the liquid filtrate is discharged through outlet means 3 and after treatment the solid is discharged through outlet means 4. Control means 5 are provided for controlling operation of the filter press equipment such that at the start of a new treatment cycle with the chambers of the filter press equipment empty and closed, valve means 22 in pipe 2 are opened permitting untreated slurry to be pumped from a storage tank 24 by a pump 23 into the chambers. At the end of the treatment cycle the control means activate a mechanism to open the chambers permitting the treated relatively dry solid cakes to discharge via outlet means 4 and, thereafter, to reclose the empty chambers which then are ready to receive a new batch of untreated slurry via pipe 2.

The cumulative mass flow of solid along pipe 2 is determined by sensor means comprising flow meter sensor means 6, for example, an electromagnetic flow meter which derives a signal indicative of the volume flow rate of slurry feed along pipe 2, and a density gauge means 8, for example, a nucleonic density gauge which derives a signal indicative of the solid content of the slurry feed. The two sensor means 6 and 8 are arranged to feed the derived signals along lines 7 and 9, respectively, to processor means 10.

Within the processor means 10 the two derived signals are fed to an integrator unit 11 which determines the cumulative mass of solid pumped into the filter press equipment during each treatment cycle. The integrator unit 11 also receives an initiating/termination signal via line 12 from a starter unit 13 directly linked via line 14 with the control means 5, the initiating/termination signal informing the integrator unit of the start and of the end of each treatment cycle.

The integrator unit 11 also receives signals via lines 15 and 16 from a timer unit 17 and from a starter means 18 arranged to activate an air valve 19 to feed compressed air to the filter press along line 20 to pressurise membranes within the chambers to apply a squeeze to the slurry during the latter portion of the treatment cycle, the squeeze operating to express filtrate from the slurry mixture. The units 13, 17 and 18 are arranged to feed signals along lines 26, 27 and 28 to a time measuring unit 30 the function of which will be described later in this specification.

The integrator unit 11 derives a signal indicative of the cumulative mass of solids throughput against time, the signal being fed along line 31 to a processor unit 32 constituting surveillance means which determines a value according to the following formula:

$$\text{Solids Mass Throughput Rate} = \frac{\frac{\rho_s}{\rho_s - 1} \int Q(\rho_F - 1)}{Dn + t}$$

where
 $\rho_s$ = preselected density of solid in slurry mixture;
 $Q$ = volume flow rate of slurry mixture sensed by flow meter 6;
 $\rho F$ = sensed density of the slurry mixture as detected by density gauge 8;
 $Dn$ = period of time representing the dead time of the treatment cycle when no slurry mixture is being pumped or urged for treatment;
 $t$ = period of time representing the running time of the treatment cycle when slurry mixture is being pumped or urged for treatment.

A signal indicative of the preselected density of the solid in the slurry mixture is fed along line 34 from a preset manually adjustable unit 35 to the processor unit 32. Signals indicative of the times Dn and t are fed along lines 36 and 38 from a timer memory unit 39 and from the previously mentioned timer unit 17, respectively.

An output signal indicative of the calculated overall solids throughput rate is fed along line 40 from the processor unit 32 to a control unit 41 which derives control signals as will be explained later in this specification for feeding along lines 42 and 44 to the starter means 18 and the filter press control means 5, respectively.

The time measuring unit 30 and the timer memory unit 39 feed signals indicative of the times Dn and Dn+1 along lines 45 and 46 to a time comparator unit 48 which also receives a preselected signal along line 51 from a preset manually adjustable unit 50 and which decides whether the interval of time Dn+1 is less than or equal to xDn but greater than or equal to Dn/x, where Dn+1 is the dead time during the current recently completed treatment cycle and x is a value defined by the presetting of the manually adjustable unit 50 and indicative of a desired range of values for the dead time Dn+1 during the current treatment cycle compared to the previously determined dead time Dn from a plurality of previously completed cycles. If the dead time Dn+1 falls within the limits defined by the comparator unit 48 a signal indicative of Dn+1 is fed along line 53 to a further processor unit 54 which determines a new updated value for Dn$^1$ as defined by the following formula:

$$Dn^1 = y\,Dn + (1-y)\,DN+1$$

where
 $Dn^1$ = newly determined value of dead time from a plurality of previously completed treatment cycles including the current recently completed treatment cycle;
 $Dn$ = old value of dead time from a plurality of previously completed treatment cycles;
 $DN+1$ = dead time of the current recently completed treatment cycle; and
 $y$ = a preselected value fed to the further processor unit 54 along line 56 from a preset manually adjustable unit 58.

A typical value for y would be 0.9 and the formula used by the further processor unit 54 ensures that calculations based on the value Dn does not fluctuate widely when Dn+1 differs from Dn. The formula provides a damping effect preventing unstable conditions.

The newly determined value Dn$^1$ is fed via line 59 to the previously mentioned timer memory unit 39 which thereby feeds the new value to the processor unit 32 which correspondingly updates its calculations.

If the comparator unit 48 finds that Dn+1 differs from Dn by an amount which is so great that the value of Dn+1 does not fall within the ratio Dn/x ≦ Dn+1 ≦ x Dn then an alarm signal is fed along line 60 to alarm means 61 which raises an audible and/or visual alarm and, if desired, stops operation of the treatment equipment until the conditions are examined.

Figure 2:
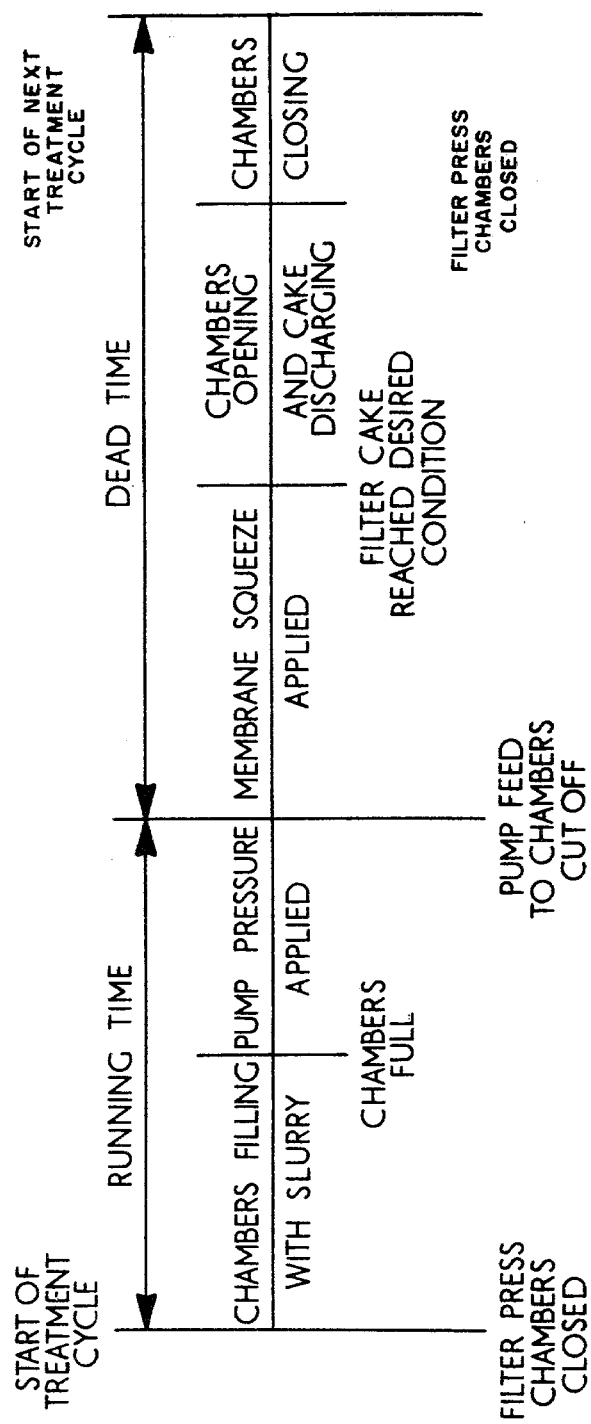
FIG. 2 illustrates the sequence of operational modes during a treatment cycle.

FIG. 2 illustrates the operating procedure during a treatment cycle of the filter press slurry treatment equipment. At the start of the treatment cycle with the filter press chambers empty and closed the valve 22 is opened under the action of the control means 5 to permit slurry mixture to be pumped along pipe 2 into the cells. After the chambers are filled with slurry the valve 22 remains open so that the slurry within the chambers is subjected to full pump pressure and filtrate is urged to drain from the slurry. After a time determined by processor means 10 the valve 22 is closed under the action of the control means 5 to prevent further slurry entering the filter press chambers. The interval of time elapsing from the start of the treatment cycle when the valve 22 is opened to the time when the valve 22 is closed, i.e., the interval of time when slurry mixture is being pumped or urged into the filter press chambers for treatment, is known as the running time of the treatment cycle.

After the valve 22 is closed the air valve 19 is opened to feed compressed air to the membrane sacs within the filter press which thereby inflate to further pressurize the material within the chambers and more filtrate is expressed from the material. Upon the solid cake mixture within the chambers reaching a preselected relatively dry condition the air valve 19 is closed, the air within the membrane sacs is vented to atmosphere and the filter press mechanism opened to allow the treated solid cakes to discharge from the chambers and from the filter press treatment equipment via outlet means 4. When the chambers are empty the mechanism is reactivated under the action of the control means 5 to close the chambers ready for the commencement of the next treatment cycle. The period of time elapsing from the closing of the slurry feed valve 22 to the time the empty chambers are reclosed, i.e., the period of time during the treatment cycle when no fresh slurry mixture is being pumped or urged into the filter press chambers for treatment, is known as the dead time of the treatment cycle.

The point at which the treated solid cake is adjudged to have reached the desired relatively dry condition can be determined by an equipment operator who uses his experience to decide when the point is reached. Alternatively, the control means 5 is fed with a control signal from a processor means provided with sensor means which determines when the desired point is reached. One embodiment of such means is disclosed in our co-pending patent application.

Figure 3:
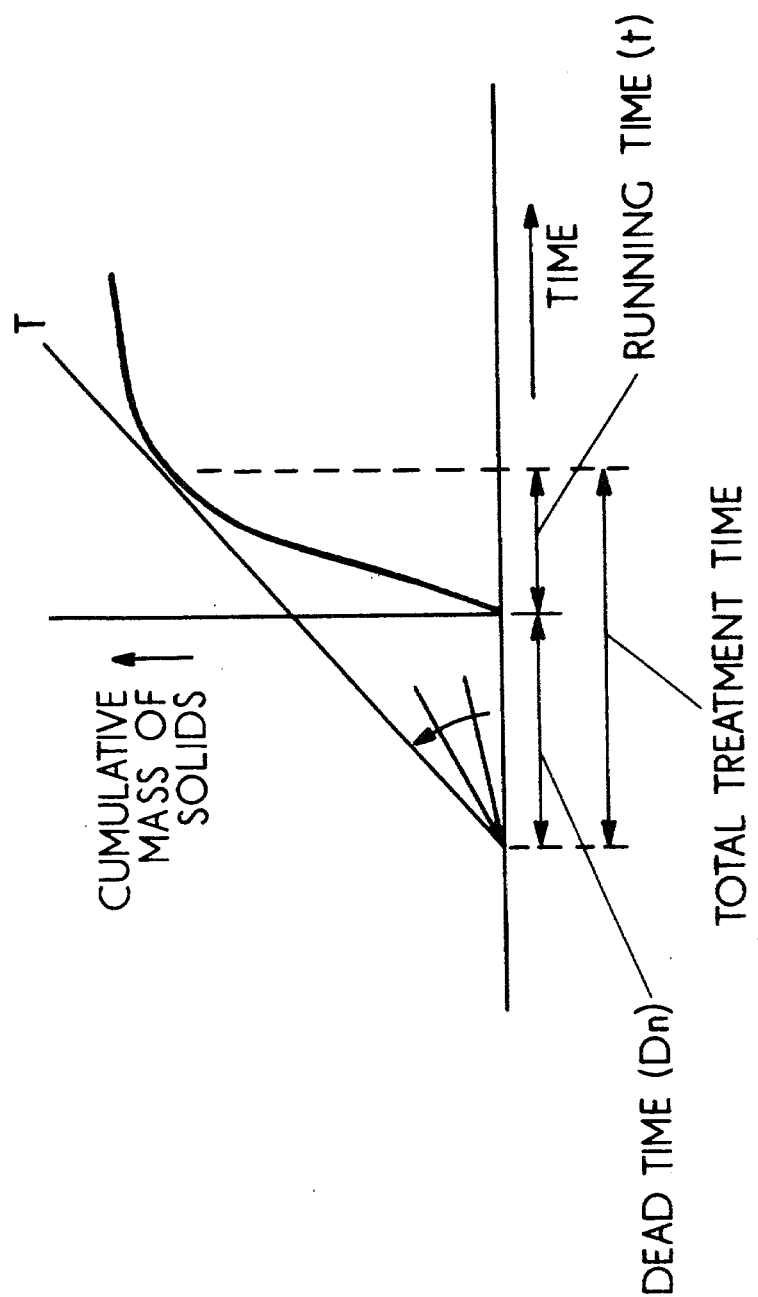
FIG. 3 is a graph showing accumulated feed against time.

During the running time of the treatment cycle signals indicative of mixture flow rate and the solid content are fed from sensor means 6 and 8 to the integrator unit 11 which determines the cumulative throughput of solid and which feeds a signal indicative of the cumulative throughput along line 31 to the processor unit 32. The processor unit 32 determines the cumulative throughput rate of solid against time which is illustrated in FIG. 3 following a graph varying from an initially steeply inclined portion when filtrate drains from the slurry at a relatively rapid rate through a less steeply inclined portion to a substantially horizontal portion when filtrate drains from the slurry only at a relatively slow rate. The processor unit 32 calculates and monitors the cumulative throughput of solid against the predicted total treatment cycle time, i.e. dead time (Dn) plus running time (t), and deduces the point when the line T of FIG. 3 is tangent to the curve, that is when line T is at its steepest angle. This point is indicative that the treatment equipment has reached the operational mode synonymous with maximum throughput of treated slurry. The processor unit 32 substantially continuously monitors the value and determines the change in the value such that as soon as zero change is detected and the change tends to become negative the processor unit knows that the maximum value substantially has been reached. The maximum value is reached when line T is a tangent to the curve as indicated in FIG. 3. Thus the processor unit 32 monitors the slope of the line T and determines when the slope reaches a maximum value. The processor unit 32 then feeds a signal along line 40 to the control unit 41 which in turn feeds a signal along line 42 to the starter unit 18 which informs the relevant integrator and timer units 11 and 30 that the running time of the current treatment cycle has ended and along line 44 to the control means 5 which thereby closes the slurry feed valve 22 and opens the air valve 19 to start the so-called dead time period of the treatment cycle.

After the start of the dead time period of the treatment cycle the timer unit 30 remains activated until it is informed via the starter units 13 and 17 that the dead time period has ended and a dead time $Dn+1$ for the current treatment cycle is determined, the dead time $Dn+1$ being fed via line 45 to the comparator unit 48 which as previously described compares the dead time $Dn+1$ of the current recently completed treatment cycle with the previously determined dead time Dn for a plurality of previously completed cycles. As previously stated, a new dead time $Dn^1$ is determined and fed to the processor unit 32 via the timer memory unit 39.

The processor unit 32 thereby is able to maintain a continuous check on the treatment process and upon the treatment cycle which if necessary is varied by the processor means such that a maximum solids throughput rate over a plurality of cycles is obtained.

I claim:

1. A method of controlling the treatment of a mixture of solid and liquid, comprising the steps of determining the mass flow rate of feed of untreated solid, determining the cumulative mass throughput of solids during running time, running time being the period of time in a treatment cycle during which the mixture feed is urged for treatment, determining a term comprising total treatment time, the total treatment time being the sum of running time and dead time, dead time being the period of time in a treatment cycle during which the mixture feed is not urged for treatment, determining the value comprising the cumulative mass throughput of solids divided by the total treatment time and monitoring said value until it reaches a maximum so that treatment process is automatically optimized to provide a maximum throughput rate of treated solids.

2. A method as claimed in claim 1, comprising deriving a further signal which is indicative that said determined value had reached the maximum value and using said further signal to terminate the previously defined running time.

3. A method as claimed in claim 2, comprising comparing the dead time for each current treatment cycle with a previously used dead time.

4. A method as claimed in claim 3, comprising determining said previously used dead time from the results of a plurality of previously completed treatment cycles.

5. A method as claimed in claim 4, comprising up-dating the previously used dead time to take account of the dead time for a current treatment cycle if the dead time for a current treatment cycle differs from said previously used dead time.

6. A method as claimed in claim 5, comprising up-dating the previously used dead time to take account of the current dead time only if the difference between the two is within a preselected amount.

7. A method as claimed in claim 6, comprising raising an alarm signal if the dead time of the current treatment cycle differs from the said previously used dead time by a further preselected amount.

8. Apparatus for controlling the treatment of a mixture of solid and liquid, comprising means for determining the mass flow rate of feed of untreated solid, means for determining the cumulative mass throughput of solid during running time, running time being the period of time in a treatment cycle during which the mixture feed is urged for treatment, said means including timer means for enabling a value of total treatment time to be determined, the total treatment time being the sum of running time and dead time, dead time being the period of time in a treatment cycle during which the mixture feed is not urged for treatment, means for determining a value comprising the cumulative mass throughput of solids divided by the total treatment time, and surveillance means for monitoring said determined value until it reaches a maximum so that the treatment process is automatically optimized to produce maximum throughput rate of treated solids.

9. Apparatus as claimed in claim 8, in which means are provided for deriving a signal which is indicative that said determined value has reached the maximum and which is used to terminate the previously defined running time.

10. Apparatus as claimed in claim 9, in which the surveillance means compares the dead time for each current treatment cycle with a previously used dead time.

11. Apparatus as claimed in claim 10, in which said previously used dead time is determined from the result of a plurality of previously completed treatment cycles.

12. Apparatus as claimed in claim 11, in which means are provided such that if the current dead time for the last completed treatment cycle differs from the said previously used dead time, the said previously used dead time is adjusted to take account of the current dead time.

13. Apparatus as claimed in claim 12, in which the previously used dead time is adjusted to take account of the current dead time only if the difference between the two is within a preselected amount.

14. Apparatus as claimed in claim 12, in which means are provided such that if the current dead time for the last completed treatment cycle differs from the said previously determined dead time by a further preselected amount an alarm signal is raised.

15. Apparatus as claimed in claim 8, in which the means for determining the rate of feed of untreated solid comprises flow meter means for determining the volume flow rate of mixture feed and a density meter means for determining the solid content of the mixture feed.

* * * * *